United States Patent
Biery et al.

(10) Patent No.: US 7,872,423 B2
(45) Date of Patent: Jan. 18, 2011

(54) SMART LOAD CONTROL DEVICE HAVING A ROTARY ACTUATOR

(75) Inventors: Ethan Charles Biery, Orefield, PA (US); Galen Edgar Knode, Macungie, PA (US); Clive Elton Lopez, Whitehall, PA (US); Joel S. Spira, Coopersburg, PA (US); Maureen E. Flowers, Center Valley, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 398 days.

(21) Appl. No.: 12/033,329

(22) Filed: Feb. 19, 2008

(65) Prior Publication Data

US 2009/0206769 A1 Aug. 20, 2009

(51) Int. Cl.
*H05B 37/02* (2006.01)
(52) U.S. Cl. .................. 315/149; 315/158; 315/291
(58) Field of Classification Search ......... 315/149–158, 315/291, 292, 294, 297, 307–308
See application file for complete search history.

(56) References Cited

U.S. PATENT DOCUMENTS

| | | | |
|---|---|---|---|
| 3,032,688 | A | 5/1962 | Spira |
| 3,864,561 | A | 2/1975 | Spira et al. |
| 4,211,959 | A | 7/1980 | Deavenport et al. |
| 4,591,765 | A | 5/1986 | Beck |
| 4,630,248 | A | 12/1986 | Scott |
| 4,654,541 | A | 3/1987 | Angott |
| 4,689,547 | A | 8/1987 | Rowen et al. |
| 4,745,351 | A | 5/1988 | Rowen et al. |
| 5,030,890 | A | 7/1991 | Johnson |
| 5,121,287 | A | 6/1992 | Lee |
| 5,239,205 | A | 8/1993 | Hoffman et al. |

(Continued)

FOREIGN PATENT DOCUMENTS

DE 4419019 A1 12/1995

(Continued)

OTHER PUBLICATIONS

European Patent Office, International Search Report and Written Opinion for International Patent Application No. PCT/US2009/001041, Nov. 17, 2009, 18 pages.

*Primary Examiner*—Douglas W Owens
*Assistant Examiner*—Tung X Le
(74) *Attorney, Agent, or Firm*—Mark E. Rose; Philip N. Smith

(57) ABSTRACT

A load control device for controlling the amount of power delivered from an AC power source to an electrical load comprises a rotary actuator, such as a rotary knob or a rotary wheel. The load control device increases and decreases the amount of power delivered to the electrical load in response to rotations of the rotary knob in first and second directions, respectively. The load control device accelerates the rate of change of the amount of power delivered to the load in response to the angular velocity of the rotary actuator. The load control device generates a ratcheting sound when the rotary actuator is rotated in the first direction at a high-end intensity of the load control device. The load control device is operable to control the electrical load in response to both actuations of the rotary actuator and digital messages received via a communication link.

20 Claims, 13 Drawing Sheets

U.S. PATENT DOCUMENTS

| | | | |
|---|---|---|---|
| 5,248,919 A | 9/1993 | Hanna et al. |
| 5,340,954 A | 8/1994 | Hoffman et al. |
| 5,666,428 A | 9/1997 | Farinelli et al. |
| 5,736,965 A | 4/1998 | Mosebrook et al. |
| 5,744,913 A * | 4/1998 | Martich et al. | 315/158 |
| 5,798,581 A | 8/1998 | Keagy et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,962,992 A * | 10/1999 | Huang et al. | 315/312 |
| 5,982,103 A | 11/1999 | Mosebrook et al. |
| 6,046,550 A | 4/2000 | Ference et al. |
| 6,169,377 B1 | 1/2001 | Bryde et al. |
| 6,270,239 B1 | 8/2001 | Sund |
| 6,310,440 B1 * | 10/2001 | Lansing et al. | 315/149 |
| 6,324,089 B1 | 11/2001 | Symoen et al. |
| 6,389,139 B1 | 5/2002 | Curtis et al. |
| 6,400,103 B1 * | 6/2002 | Adamson | 315/292 |
| RE38,069 E | 4/2003 | Posa |
| 6,545,434 B2 | 4/2003 | Sembhi et al. |
| 6,687,487 B1 | 2/2004 | Mosebrook et al. |
| 6,751,167 B2 | 6/2004 | Yamada et al. |
| 6,803,728 B2 | 10/2004 | Balasubramaniam et al. |
| 6,807,463 B1 | 10/2004 | Cunningham et al. |
| 6,888,315 B1 | 5/2005 | Hsiao |
| 6,901,439 B1 | 5/2005 | Bonasia et al. |
| 6,927,547 B2 | 8/2005 | Walko, Jr. et al. |
| 6,930,455 B2 | 8/2005 | Chansky et al. |
| 6,980,080 B2 | 12/2005 | Christensen et al. |
| 7,072,671 B2 | 7/2006 | Leitch |
| 7,082,339 B2 | 7/2006 | Murray et al. |
| 7,092,772 B2 | 8/2006 | Murray et al. |
| 7,123,140 B1 | 10/2006 | Denes |
| 7,219,141 B2 | 5/2007 | Bonasia et al. |
| 7,307,542 B1 | 12/2007 | Chandler et al. |
| 7,423,413 B2 | 9/2008 | Dobbins et al. |
| D593,948 S | 6/2009 | Biery et al. |
| 2002/0067144 A1 | 6/2002 | Hoffknecht et al. |
| 2004/0052076 A1 | 3/2004 | Mueller et al. |
| 2005/0013196 A1 | 1/2005 | Russo |
| 2005/0179404 A1 * | 8/2005 | Veskovic et al. | 315/291 |
| 2006/0012317 A1 | 1/2006 | Chiu et al. |
| 2006/0038497 A1 | 2/2006 | Baker et al. |
| 2006/0174102 A1 | 8/2006 | Smith et al. |
| 2006/0273741 A1 * | 12/2006 | Stalker, III | 315/291 |
| 2006/0273970 A1 | 12/2006 | Mosebrook et al. |
| 2006/0284734 A1 | 12/2006 | Newman, Jr. |
| 2007/0290874 A1 | 12/2007 | Nearhoof et al. |
| 2007/0291010 A1 | 12/2007 | Altonen et al. |
| 2008/0007897 A1 | 1/2008 | Hash |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0136663 A1 | 6/2008 | Courtney et al. |
| 2008/0258650 A1 | 10/2008 | Steiner et al. |
| 2008/0278297 A1 | 11/2008 | Steiner et al. |

FOREIGN PATENT DOCUMENTS

| | | |
|---|---|---|
| DE | 19601399 A1 | 7/1996 |
| GB | 2251727 A | 7/1992 |
| WO | WO 98/26394 A | 6/1998 |
| WO | WO 01/52515 A1 | 7/2001 |

* cited by examiner

SMART LOAD CONTROL DEVICE HAVING A ROTARY ACTUATOR

BACKGROUND OF THE INVENTION

1. Field of the Invention

The present invention relates to a load control device for controlling the amount of power delivered from an alternating-current (AC) power source to an electrical load, and more particularly, to a smart lighting control device having a rotary intensity adjustment actuator, such as a rotary knob or a rotary wheel, for control of the intensity of a connected lighting load.

2. Description of the Related Art

A conventional wall-mounted load control device is mounted to a standard electrical wallbox and is coupled between an alternating-current (AC) power source (typically 50 or 60 Hz line voltage AC mains) and an electrical load. Standard load control devices, such as dimmers and motor speed controls, use a bidirectional semiconductor switch, such as a triac, or one or more field effect transistors (FETs), to control the current delivered to the load, and thus, the intensity of the lighting load or the speed of the motor. Dimmers have a line terminal (or hot terminal) coupled to the AC power source and a load terminal (e.g., a dimmed hot or a switched hot terminal) coupled to the electrical load, such that the semiconductor switch is coupled in series between the source and the electrical load. Using a phase-control dimming technique, the dimmer renders the semiconductor switch conductive for a portion of each line half-cycle and renders the semiconductor switch non-conductive for the other portion of the line half-cycle to selectively provide power to the load.

A typical dimmer also has a mechanical switch coupled in series with the semiconductor switch to disconnect the electrical load from the AC power source to turn the electrical load on and off. An actuator provided at the user interface of the wall-mounted dimmer allows a user to actuate the mechanical switch to toggle the load on and off. The dimmer often comprises an intensity adjustment actuator to allow the user to adjust the amount of power being delivered to the load. For example, a prior art rotary dimmer comprises a rotary knob for adjusting a rotary potentiometer inside the dimmer to adjust the intensity of a connected lighting load. The rotary knob of the rotary dimmer may also be pressed in to actuate a mechanical switch in the dimmer to turn the lighting load on and off.

Some load control devices, such as "smart" two-wire dimmers, include a microprocessor or other processing means for providing an advanced set of control features and feedback options to the end user. The advanced features of a smart dimmer may include, for example, a protected or locked lighting preset, fading, and double-tap to full intensity. To power the microprocessor, smart two-wire dimmers include power supplies, which draw a small amount of current through the lighting load each half-cycle when the semiconductor switch is non-conductive. The power supply typically uses this small amount of current to charge a storage capacitor and develop a direct-current (DC) voltage to power the microprocessor. An example of a smart dimmer is disclosed in commonly assigned U.S. Pat. No. 5,248,919, issued on Sep. 28, 1993, entitled LIGHTING CONTROL DEVICE, which is herein incorporated by reference in its entirety.

Smart dimmers have also been included as part of multi-location lighting control systems, such as, for example, a radio-frequency (RF) lighting control system. Such lighting control systems have included main dimmers wired directly to controller lighting loads, and remote control devices (such as keypads or remote dimmers). Each of the main dimmers and remote dimmers of the prior art multi-location lighting control systems typically comprise, for example, a rocker switch, rather than a rotary knob or a slider control, for adjustment of the intensity of the locally-controlled or remotely-controlled lighting loads. Each of the main and remote dimmers may also comprise one or more visual indicators, e.g., light-emitting diodes (LEDs), to provide feedback of the intensity of the controlled lighting load to the user. However, user interfaces of such dimmers are not always easy to understand and use for a novice user of the multi-location lighting control system.

Thus, there is a need for a smart load control device that has a simple, intuitive user interface (for example, including a rotary knob) and is able to be included as part of a multi-location load control system.

SUMMARY OF THE INVENTION

According to the present invention, a load control device for controlling the amount of power delivered from an AC power source to an electrical load comprises a controllably conductive device, a controller, and a rotary actuator, such as a rotary knob or a rotary wheel. The controllably conductive device is adapted to be coupled in series electrical connection between the AC power source and the electrical load for control of the amount of power delivered to the load. The controller is coupled to a control input of the controllably conductive device, such that the controller is operable to selectively render the controllably conductive device conductive and non-conductive to control the amount of power delivered to the load. The rotary actuator is operable to rotate in a first direction and a second direction. The controller is also responsive to rotations of the rotary actuator to increase the amount of power delivered to the load when the rotary actuator is rotated in the first direction and to decrease the amount of power delivered to the load when the rotary actuator is rotated in the second direction. The load control device further comprises a rotary encoder having a shaft coupled to the rotary actuator and operable to generate one or more control signals in response to the rotations of the rotary actuator, the rotary encoder coupled to the controller, such that the controller is operable to control the amount of power delivered to the load in response to the one or more control signals. The controller is operable to accelerate the rate of change of the amount of power delivered to the load in response to an angular velocity of the rotary actuator.

According to another embodiment of the present invention, the load control device comprises an audible sound generator responsive to the controller, such that the controller is operable to cause the audible sound generator to repeatedly generate an audible sound when the rotary actuator is rotated and the lamp control module is delivering a predetermined amount of power to the load. Preferably, the controller is operable to increase and decrease the amount of power delivered to the load when the rotary actuator is rotated in first and second directions, respectively, and to cause the audible sound generator to repeatedly generate the audible sound when the rotary actuator is rotated in the first direction and the lamp control module is delivering a maximum amount of power to the load. The controller may also be operable to cause the audible sound generator to repeatedly generate the audible sound when the rotary actuator is rotated in the second direction and the lamp control module is delivering a minimum amount of power to the load (i.e., the load is off).

In addition, the present invention provides a method of generating an audible sound in a load control device for controlling the amount of power delivered from an AC power source to an electrical load. The method comprising the steps of: (1) providing a rotary actuator on the load control device; (2) adjusting the amount of power delivered to the load when the rotary actuator is rotated; and (3) repeatedly generating an audible sound when the rotary actuator is rotated and the lamp control module is delivering a predetermined amount of power to the load. Preferably, the method further comprises the steps of increasing the amount of power delivered to the load when the rotary actuator is rotated in a first direction, and repeatedly generating the audible sound when the lamp control module is delivering a maximum amount of power to the load and the rotary actuator is rotated in the first direction.

Other features and advantages of the present invention will become apparent from the following description of the invention that refers to the accompanying drawings.

DETAILED DESCRIPTION OF THE INVENTION

Figure 1:
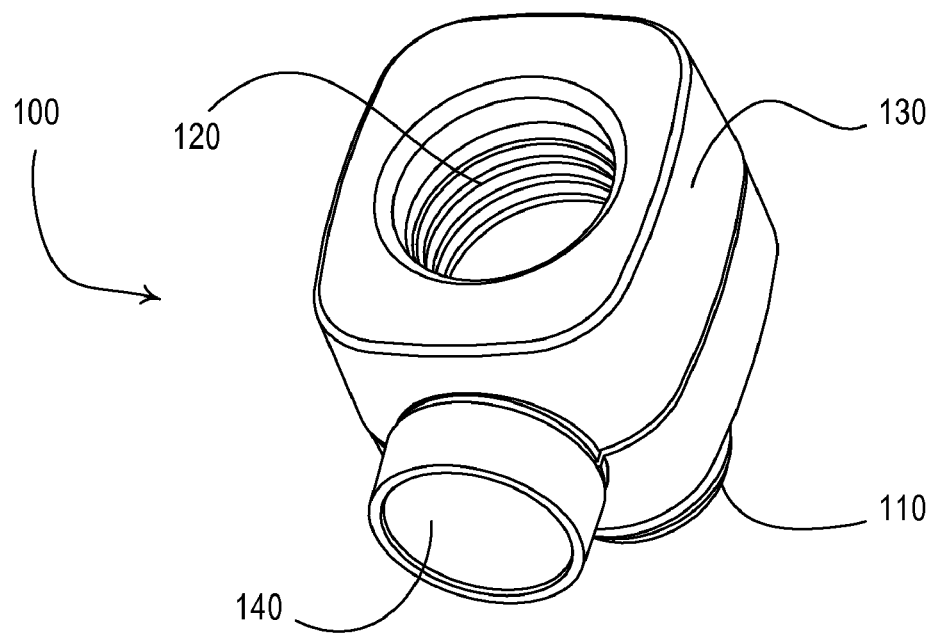
FIG. 1 is a perspective view and FIG. 2 is a front view of a "smart" electronic lamp control module having a rotary knob for control of the amount of power delivered to a lighting load according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
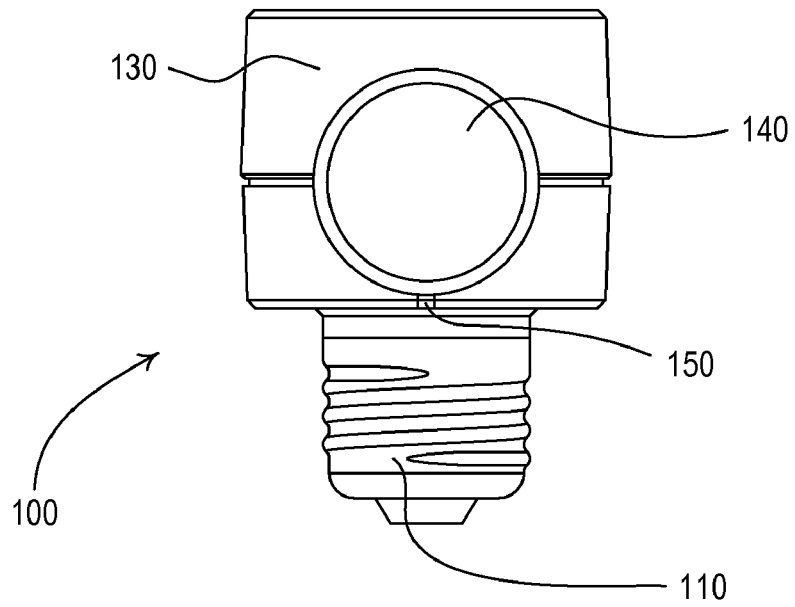

FIG. 1 is a perspective view and FIG. 2 is a front view of a "smart" electronic lamp control module 100 according to the present invention. The lamp control module 100 has a screw-in base 110, such that the lamp control module 100 is adapted to be screwed into a standard Edison socket. The lamp control module 100 also includes a socket portion 120 (e.g., a standard Edison socket), such that a lighting load 204 (FIG. 4), for example, a standard incandescent lamp, may be coupled to and controlled by the lamp control module. The lamp control module 100 comprises a controllably conductive device 210 (FIG. 4), which is contained within a housing 130 and provides for control of the amount of power delivered to the lighting load 204. When the lamp control module 100 is screwed into a standard Edison socket that is powered by an AC power source 202 (FIG. 4), such as an AC mains voltage (e.g., 120 VAC at 60 Hz), and the lighting load 204 is screwed into the socket portion, the controllably conductive device 210 is coupled in series electrical connection between the AC power source and the lighting load 204 and is rendered conductive and non-conductive to control an intensity level L of the lighting load.

The lamp control module 100 further comprises a rotary intensity adjustment actuator, e.g., a rotary knob 140, which allows a user to adjust of the intensity level L of the lighting load 204. When the user turns the rotary knob 140 clockwise, the intensity level L of the lighting load 204 is increased until the intensity level reaches a maximum (or high-end) intensity level $L_{MAX}$. As the rotary knob 140 is turned counter-clockwise, the intensity level L of the lighting load 204 is decreased until the intensity level reaches a minimum intensity level (e.g., 0%), such that lighting load is turned off. A visual indicator 150, e.g., a light emitting diode (LED), is provided below the rotary knob 140 and is illuminated to provide visual feedback to the user, e.g., to indicate the whether the lighting load 204 is on or off.

The user is operable to push the rotary knob 140 in towards the housing 130 of the lamp control module 100 to toggle (i.e., turn on and off) the lighting load 204. Preferably, when the lighting load 204 is turned on in response to a press of the rotary knob 140, the lamp control module 100 turns the lighting load on to a preset lighting intensity level $L_{PRESET}$ (e.g., the intensity level of the lighting load before the lighting load was last turned off). Alternatively, the preset intensity level $L_{PRESET}$ could be set to a fixed level, for example, 80%, such that the lighting load 204 is controlled to 80% of the maximum intensity level $L_{MAX}$ when the rotary knob 140 is pressed to turn on the lighting load.

Figure 3:
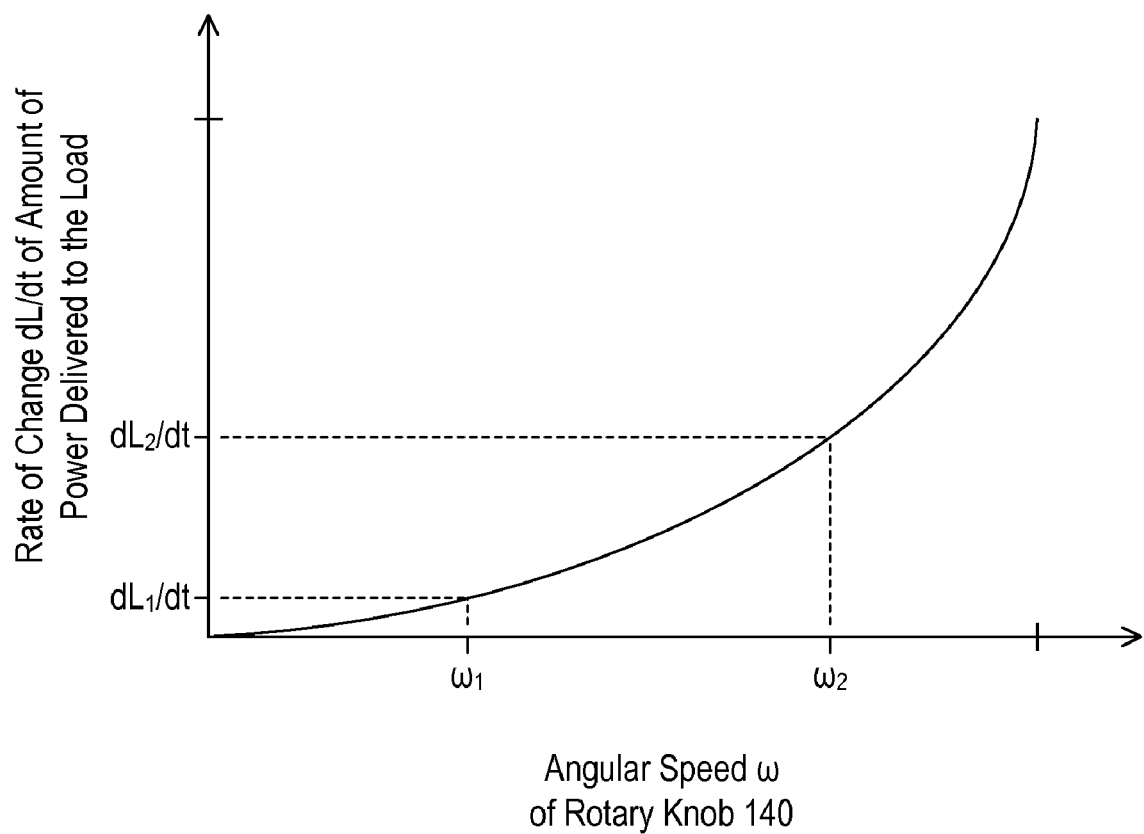
FIG. 3 is a plot of the rate of change of the amount of power delivered to the lighting load by the lamp control module of FIG. 1 with respect to the angular speed of the rotary knob.

According to the present invention, the lamp control module 100 controls the rate of change dL/dt of the intensity level L of lighting load 204 with respect to time in dependence upon the angular velocity ω of the rotary knob 140 (i.e., the rate of change dθ/dt of the position of the rotary knob). Specifically, the lamp control module 100 is operable to accelerate the rate of change dL/dt of the intensity level L of lighting load 204 with respect to the angular velocity ω of the rotary knob 140 as shown in FIG. 3. For example, if the rotary knob 140 is rotated clockwise at a first angular velocity $\omega_1$, the lamp control module 100 increases the intensity level L of the lighting load 204 at a first rate of change $dL_1/dt$, where $dL_1/dt = \alpha \cdot \omega_1$. If rotary knob 140 is then turned more quickly at a second angular velocity $\omega_2$ greater than the first angular velocity $\omega_1$, the lamp control module 100 is operable to increase the intensity level L of the lighting load 204 at a second rate of change $dL_2/dt$, where $dL_2/dt = \beta \cdot \omega_2$ and $\beta > \alpha$. Therefore, the user can turn the rotary knob 140 slowly to achieve fine resolution in the adjustment of the intensity level L of the lighting load 204 and can turn the rotary knob quickly to achieve a faster response of the intensity level L of the lighting load 204.

The rotary knob 140 is continuously rotatable, such that the user may continue to rotate the rotary knob clockwise after the lighting load 204 has reached the high-end intensity $L_{MAX}$. In other words, the rotary knob 140 does not have maximum and minimum limits, even though the intensity of the lighting load 204 is controlled to maximum and minimum intensities. The position of the rotary knob 140 is not representative of the intensity level L of the lighting load 204.

The lamp control module 100 is also operable to provide audible feedback to the user. Specifically, the lamp control module 100 generates a first audible sound (e.g., a click at a first frequency $f_1$) when the lighting load 204 is turned on, and a second audible sound (e.g., a click at a second frequency $f_2$) when the lighting load 204 is turned off. Further, the lamp control module 100 is operable to repetitively generate the first audible sound (to produce a "ratcheting" sound) when the rotary knob 140 is rotated clockwise after the lighting load 204 is controlled to the high-end intensity $L_{MAX}$. Accordingly, the user is signaled that the lighting load 204 is at the high-end intensity $L_{MAX}$ and that continued clockwise rotations of the rotary knob 140 will not affect the intensity level L of the lighting load. When the rotary knob 140 is rotated counter-clockwise until the lighting load 204 is controlled to off, the lamp control module 100 generates the second audible sound. Alternatively, the lamp control module 100 could generate a ratcheting sound (by repetitively generating the second audible sound) when the lighting load 204 is off and the rotary knob 140 is rotated counter-clockwise.

Figure 4:
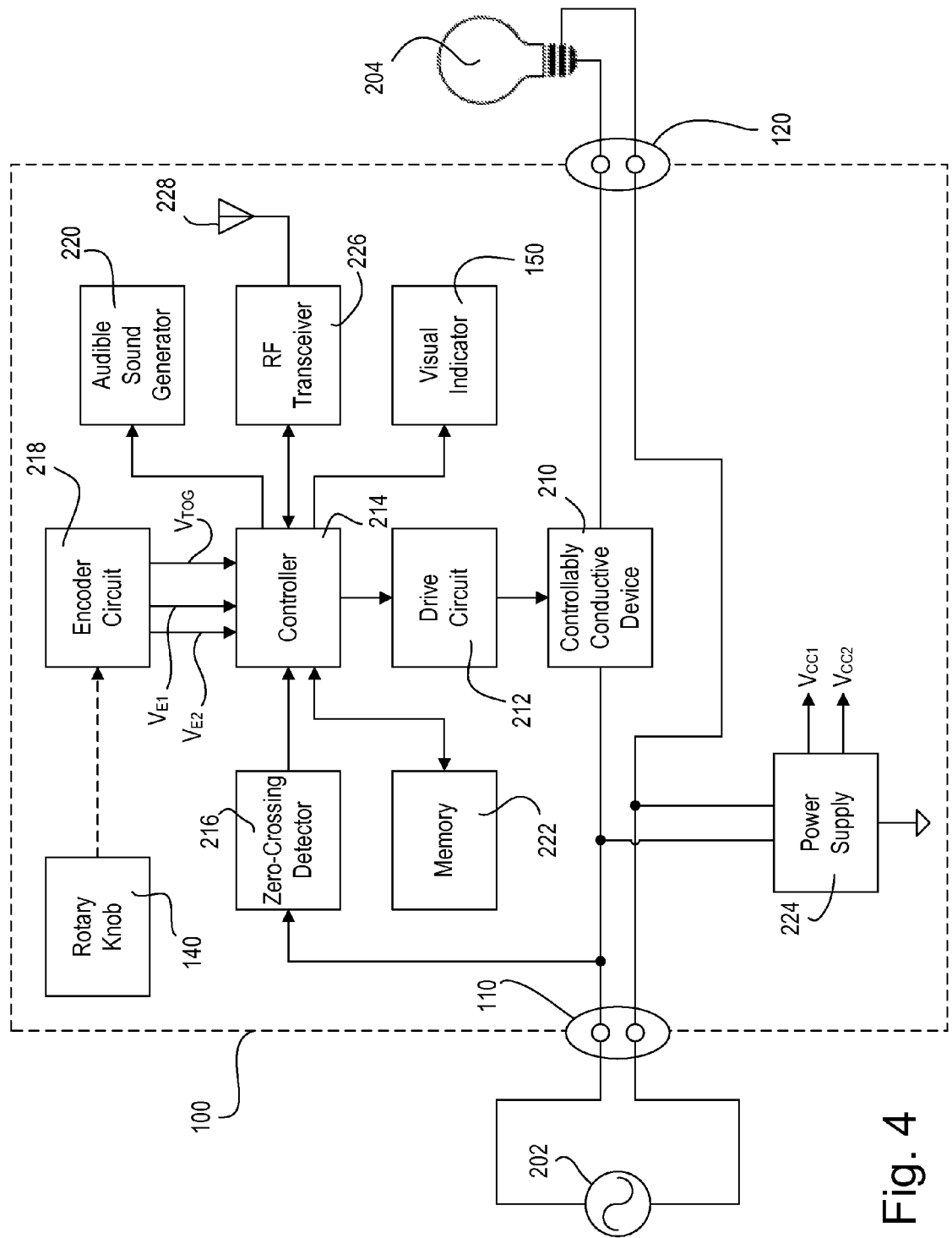
FIG. 4 is a simplified block diagram of the lamp control module of FIGS. 1 and 2.

FIG. 4 is a simplified block diagram of the lamp control module 100 according to the present invention. As shown, the screw-in base 110 is coupled to the AC power source 202 and the lighting load 204 is coupled to the socket portion 120. The controllably conductive device 210 is coupled in series electrical connection between the screw-in base 110 and the socket portion 120 for control of the amount of power delivered to the lighting load 204. The controllably conductive device 210 may comprise any suitable type of bidirectional semiconductor switch, such as, for example, a triac, a field-effect transistor (FET) in a rectifier bridge, or two FETs in anti-series connection. A controller 214 is coupled to a control input of the controllably conductive device 210 via a drive circuit 212, such that the controller is operable to selectively render the controllably conductive device conductive and non-conductive to control the intensity level L of the lighting load 204. The controller 214 is preferably implemented as a microcontroller, but may be any suitable processing device, such as a programmable logic device (PLD), a microprocessor, or an application specific integrated circuit (ASIC). The drive circuit 212 preferably comprises an optocoupler, such that the controller 214 is electrically isolated from the AC power source 202.

A zero-crossing detect circuit 216 determines the zero-crossing points of the AC source voltage from the AC power supply 202. A zero-crossing is defined as the time at which the AC supply voltage transitions from positive to negative polarity, or from negative to positive polarity, at the beginning of each half-cycle. The zero-crossing information is provided as an input to the controller 214. The controller 214 generates the gate control signals to operate the semiconductor switch 210 to thus provide voltage from the AC power supply 202 to the lighting load 204 at predetermined times relative to the zero-crossing points of the AC waveform.

The controller 214 is operable to control the intensity level L of the lighting load 204 in response the rotary knob 140 and to illuminate the visual indicator 150 to display feedback to the user of the lamp control module 100. The rotary knob 140 is mechanically coupled to the shaft of a rotary encoder 310 (FIG. 5) of an encoder circuit 218. In response to the actuations of the rotary knob 140, the encoder circuit 218 generates three control signals, which are provided to the controller 214. Specifically, the encoder circuit 218 generates a toggle control signal $V_{TOG}$, which is representative of the instances when the rotary knob 140 is pushed in, i.e., to toggle the lighting load 204 on and off. The encoder circuit 218 also generates a first encoder control signal $V_{E1}$ and a second encoder control signal $V_{E2}$, which in combination are representative of the angular velocity $\omega$ at which the rotary knob 140 is rotated and the direction (i.e., either clockwise or counter-clockwise) in which the rotary knob is rotated.

The lamp control module 100 further comprises an audible sound generator 220 coupled to the controller 214. The controller is operable to cause the sound generator to produce the first and second audible sounds in response to actuations of the rotary knob 140. A memory 222 is coupled to the controller 214 and is operable to store control information of the lamp control module 100, such as the preset intensity level $L_{PRESET}$ of the lighting load 204. The lamp control module 100 comprises a power supply 224, which generates a first direct-current (DC) voltage $V_{CC1}$ (e.g., approximately 2.8 volts) for powering the controller 214 and the other low-voltage circuitry of the lamp control module, and a second DC voltage $V_{CC2}$ (e.g., approximately 20 volts) for powering the audible sound generator 220.

The lamp control module 100 may optionally comprise a communication circuit, e.g., a radio-frequency (RF) transceiver 226 and an antenna 228, such that the controller 214 is operable to transmit and receive digital messages with other control devices as part of a multi-location load control system (which will be described in greater detail with reference to FIG. 11). Alternatively, other types of communication circuits may be used for transmitting and receiving digital messages on other types of communication links, such as, for example, infrared (IR) communication links, power-line carrier (PLC) communication links, and wired communication links.

Figure 5:
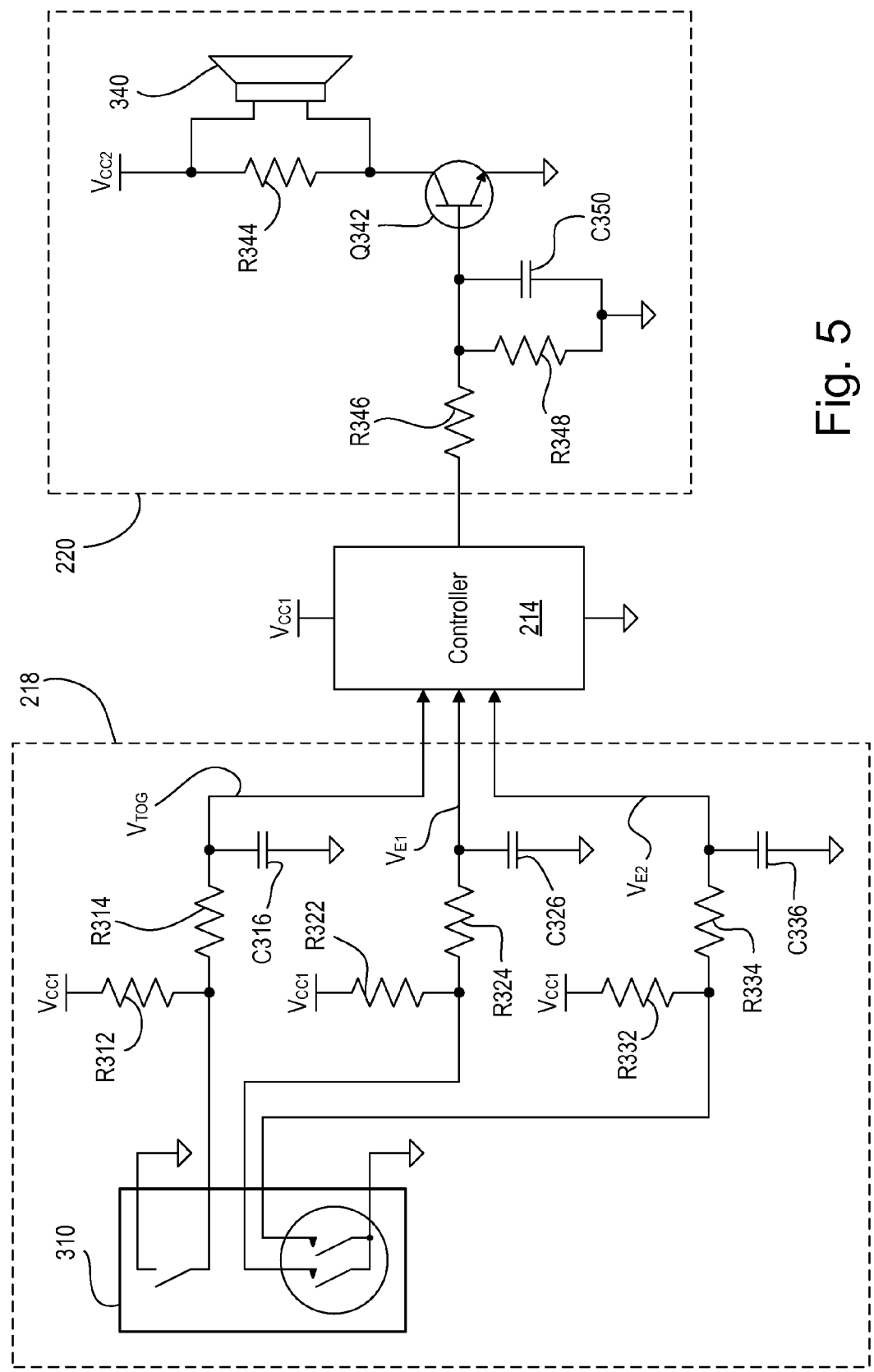
FIG. 5 is a simplified schematic diagram showing an encoder circuit and an audible sound generator of the lamp control module of FIG. 4.

FIG. 5 is a simplified schematic diagram showing the encoder circuit 218 and the audible sound generator 220 in greater detail. The rotary encoder 310 of the encoder circuit 218 may comprise, for example, part number PEC 12-2217F-S0024, manufactured by Bourns, Inc. The three outputs of the rotary encoder 310 are pulled up to the first DC voltage $V_{CC1}$ through resistors R312, R322, R332 (which preferably all have resistances of 15 kΩ). The outputs of the rotary encoder 310 are filtered by RC circuits to generate the toggle control signal $V_{TOG}$, the first encoder control signal $V_{E1}$, and the second encoder control signal $V_{E2}$. The RC circuits comprise resistors R314, R324, R334 (which preferably all have resistances of 15 kΩ), and capacitors C316, C326, C336 (which preferably all have capacitances of 1000 pF).

The rotary encoder 310 includes a single-pole single-throw (SPST) momentary mechanical switch, which is actuated to generate the toggle control signal $V_{TOG}$. Accordingly, when the rotary knob 140 is pushed in, the mechanical switch is closed and the toggle control signal $V_{TOG}$ is pulled low towards circuit common (i.e., approximately zero volts). Otherwise, the toggle control signal $V_{TOG}$ is pulled high towards the first DC voltage $V_{CC1}$.

Figure 6A:
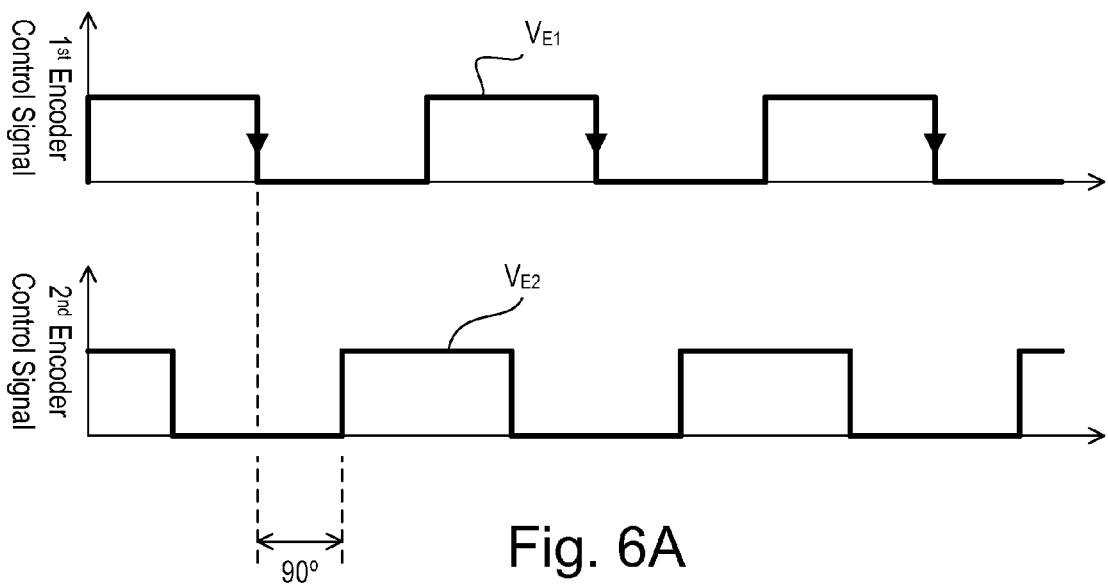
FIG. 6A is a simplified diagram of a first encoder control signal and a second encoder control signal when the rotary knob of FIGS. 1 and 2 is turned clockwise.
Figure 6B:
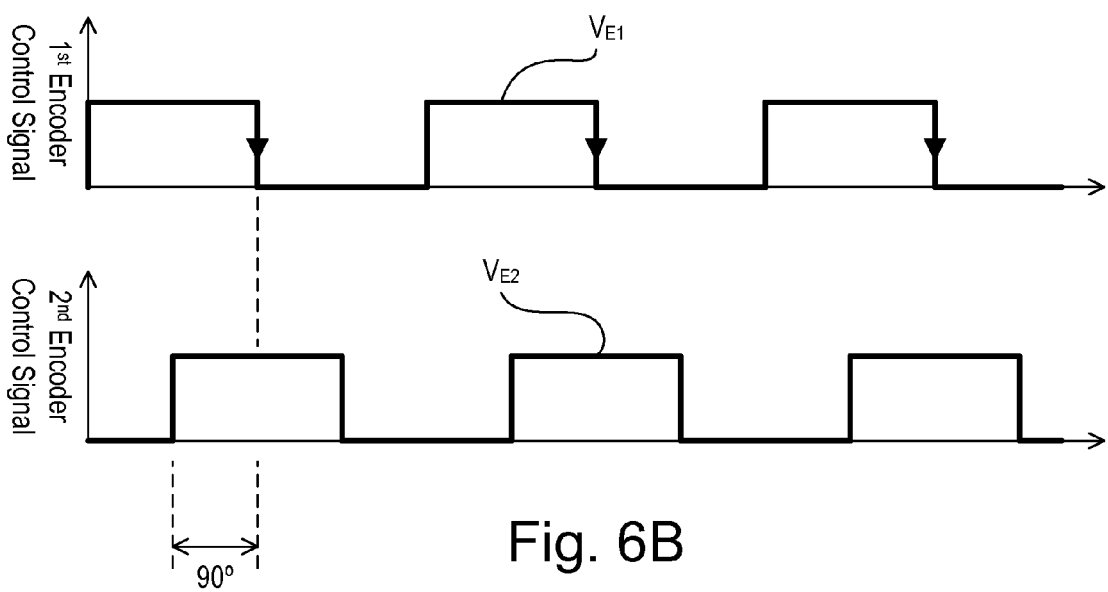
FIG. 6B is a simplified diagram of the first encoder control signal and the second encoder control signal when the rotary knob of FIGS. 1 and 2 is turned counter-clockwise.

The rotary encoder 310 produces two pulse waveforms that are 90° out-of-phase and are filtered by the RC circuits to generate the first encoder control signals $V_{E1}$ and the second encoder control signal $V_{E2}$. FIG. 6A is a simplified diagram of the first encoder control signal $V_{E1}$ and the second encoder control signal $V_{E2}$ when the rotary knob 140 is being turned clockwise. FIG. 6B is a simplified diagram of the first encoder control signal $V_{E1}$ and the second encoder control signal $V_{E2}$ when the rotary knob 140 is being turned counter-clockwise. The first encoder control signal $V_{E1}$ lags the second encoder control signal $V_{E2}$ by 90° when the rotary knob 140 is turned clockwise, while the second encoder control signal $V_{E2}$ lags the first encoder control signal $V_{E1}$ by 90° when the rotary knob 140 is turned counter-clockwise. Accordingly, the controller 214 is operable to determine whether the second encoder control signal $V_{E2}$ is low (i.e., at approximately circuit common) or high (i.e., at approximately the first DC voltage $V_{CC1}$) at the times of the falling edges of the first encoder control signal $V_{E1}$ (i.e., when the first encoder control signal $V_{E1}$ transitions from high to low) to thus determine that the rotary knob 140 is being turned clockwise or counter-clockwise, respectively.

Further, the controller 214 is operable to use the frequency $f_E$ of the first encoder control signal $V_{E1}$ to determine how fast the rotary knob 140 is being turned. Specifically, the controller 214 counts the number of falling edges of the first encoder control signal $V_{E1}$ during a predetermined time period T (e.g., every 100 msec) and determines a corresponding intensity change value ΔINT by which to adjust the intensity level L of the lighting load 204. Preferably, the rotary encoder 310 produces a predetermined number N (e.g., 24) of pulses in each of the first and second encoder control signals $V_{E1}$, $V_{E2}$ during a full rotation (i.e., 360°) of the rotary knob 140.

The audible sound generator 220 comprises a piezoelectric buzzer (or speaker) 340 for generating the first and second audible sounds. The buzzer 340 is coupled between the second DC voltage $V_{CC2}$ and circuit common through an NPN bipolar junction transistor Q342. A resistor R344 is coupled across the buzzer 340 and preferably has a resistance of 1 kΩ. The controller 214 is coupled to the base of the transistor Q342 via a circuit comprising two resistors R346, R348 (preferably having resistances of 3.3 kΩ and 15 kΩ, respectively) and a capacitor C350 (preferably having a capacitance of 0.01° F.).

The controller 214 is operable to control the transistor Q342 to be conductive and non-conductive in predetermined fashions to cause the buzzer 340 to generate the first and second audible sounds. For the first audible sound, the controller 214 generates three pulses of voltage across the buzzer 340 at a first frequency $f_1$ (e.g., 1500 Hz) at a first duty cycle (e.g., 12%). Specifically, the transistor Q342 is repetitively rendered conductive for 80 μsec and then non-conductive for 587 μsec to generate the three pulses. For the second audible sound, the controller 214 generates three pulses of voltage across the buzzer 340 at a second frequency $f_2$ (e.g., 4319 Hz) at a second duty cycle (e.g., 37%), such that the transistor Q342 is repetitively rendered conductive for 80 μsec and then non-conductive for 145 μsec to generate the three pulses.

Figure 7:
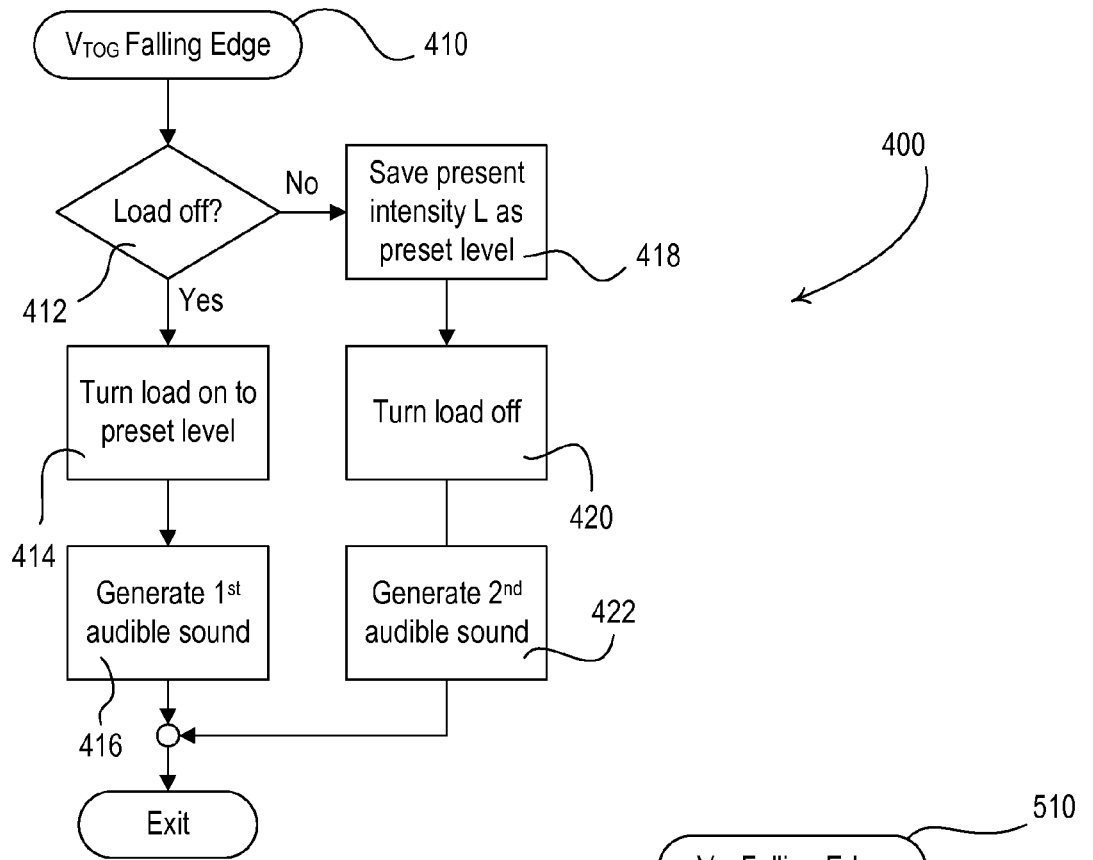
FIG. 7 is a simplified flowchart of a rotary knob press procedure executed by a controller of the lamp control module of FIG. 4.

FIG. 7 is a simplified flowchart of a rotary knob press procedure 400, which is executed by the controller 214 in response to a falling edge of the toggle control signal $V_{TOG}$ at step 410. If the lighting load 204 is presently off at step 412, the controller 214 turns the lighting load on to the preset intensity level $L_{PRESET}$ stored in the memory 222 at step 414 and generates the first audible sound at step 416, before the press procedure 400 exits. Otherwise, if the lighting load 204 is presently on at step 412, the controller 214 stores the present intensity level L as the preset intensity level $L_{PRESET}$ in the memory 222 at step 418, and turns the lighting load 204 off at step 420. The controller 214 then generates the second audible sound at step 422, and the press procedure 400 exits.

Figure 8:
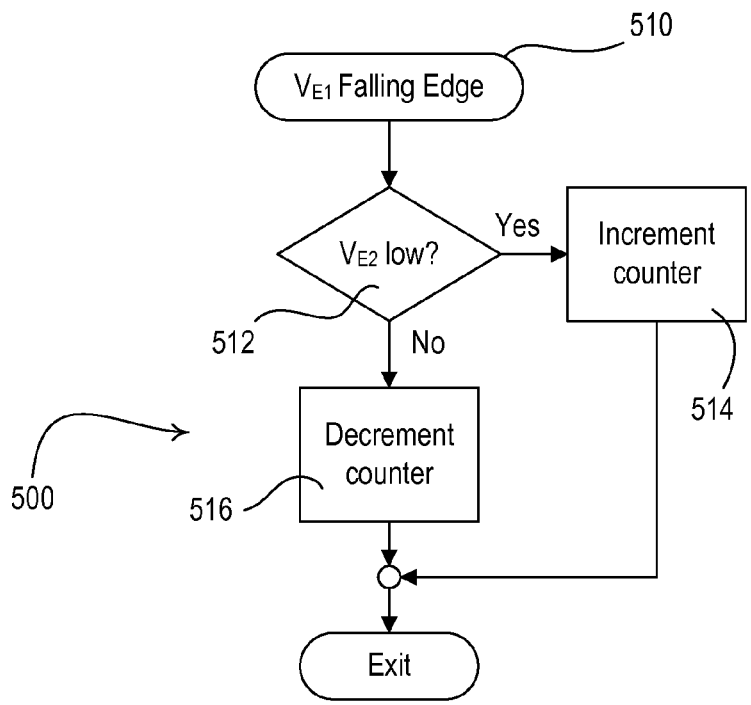
FIG. 8 is a simplified flowchart of a count procedure executed by the controller of the lamp control module of FIG. 4.

FIG. 8 is a simplified flowchart of a count procedure 500, which is executed by the controller 214 in response to a falling edge of the first encoder control signal $V_{E1}$ at step 510. The controller 214 uses a counter to keep track of the number of falling edges (i.e., the number of pulses) of the first encoder control signal $V_{E1}$ that have occurred during the predetermined timer period T to determine how fast the rotary knob 140 is being turned. If the second encoder control signal $V_{E2}$ is low at step 512 (i.e., the rotary knob 140 is being turned clockwise), the controller 214 increments the counter by one at step 514 and the count procedure 500 exits. Otherwise, if the rotary knob 140 is being turned counter-clockwise at step 512, the controller 214 decrements the counter by one at step 516, before the count procedure 500 exits.

Figure 9:
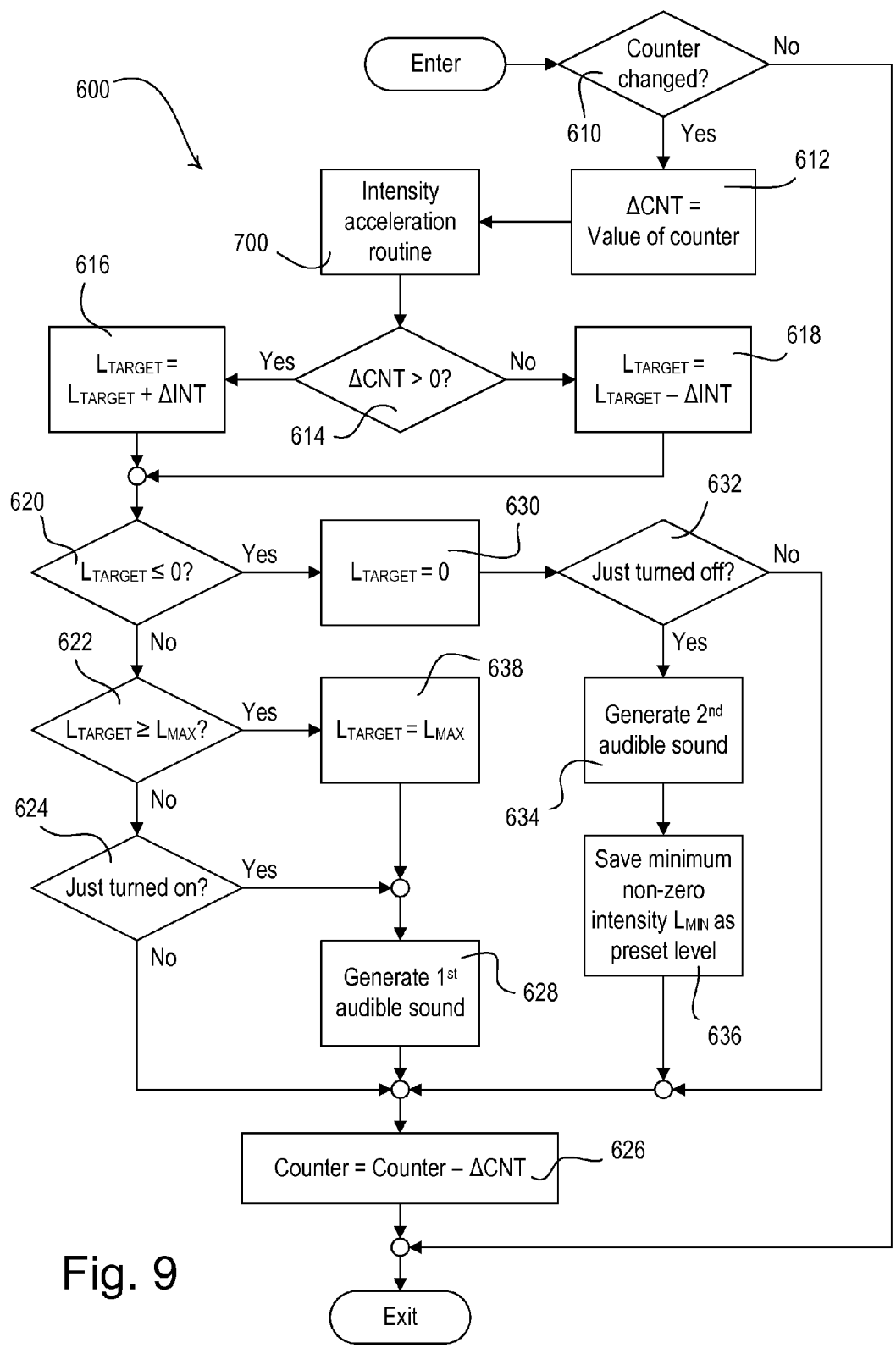
FIG. 9 is a simplified flowchart of an intensity adjustment procedure executed by the controller of the lamp control module of FIG. 4.

FIG. 9 is a simplified flowchart of an intensity adjustment procedure 600 executed periodically by the controller 214 (e.g., at the beginning of each predetermined time period T. i.e., every 100 msec). If the counter has not changed in value at step 610 since the last time that the intensity adjustment procedure 600 was executed, the intensity adjustment procedure 600 simply exits. However, if the counter has changed in value at step 610 since the last execution of the intensity adjustment procedure 600, the controller 214 analyzes the number of falling edges of the first encoder control signal $V_{E1}$ that occurred in the last time period T (i.e., in the last 100 msec). Specifically, at step 612, the controller 214 reads the value of the counter and stores this value in a variable ΔCNT for use during the intensity adjustment procedure 600. Since the value of the counter is recorded at the beginning of each predetermined time period T, the counter value ΔCNT is representative of the angular velocity ω of the rotary knob 140, i.e., ω=[(ΔCNT/N)·360°]/T.

The controller 214 executes an intensity acceleration routine 700 to determine the intensity change value ΔINT in response to the counter value ΔCNT. During the intensity acceleration routine 700, the controller 214 applies an appropriate acceleration to the intensity change value ΔINT in response to how quickly the rotary knob 140 is being turned. After the intensity acceleration routine 700 is executed, the intensity change value ΔINT is added to or subtracted from a target intensity level $L_{TARGET}$, which is used to determine the actual amount of power delivered to the lighting load 204. The target intensity $L_{TARGET}$ preferably comprises an integer between 0 (when the lighting load 204 is off) and 255 (when the lighting load is at the high-end intensity $L_{MAX}$) Since the lighting load 204 is controlled to the target intensity $L_{TARGET}$ once each predetermined time period T and the target intensity $L_{TARGET}$ is determined from the counter value ΔCNT, the rate of change dL/dt of the intensity level L of the lighting load is dependent upon the angular velocity ω of the rotary knob 140.

Figure 10:
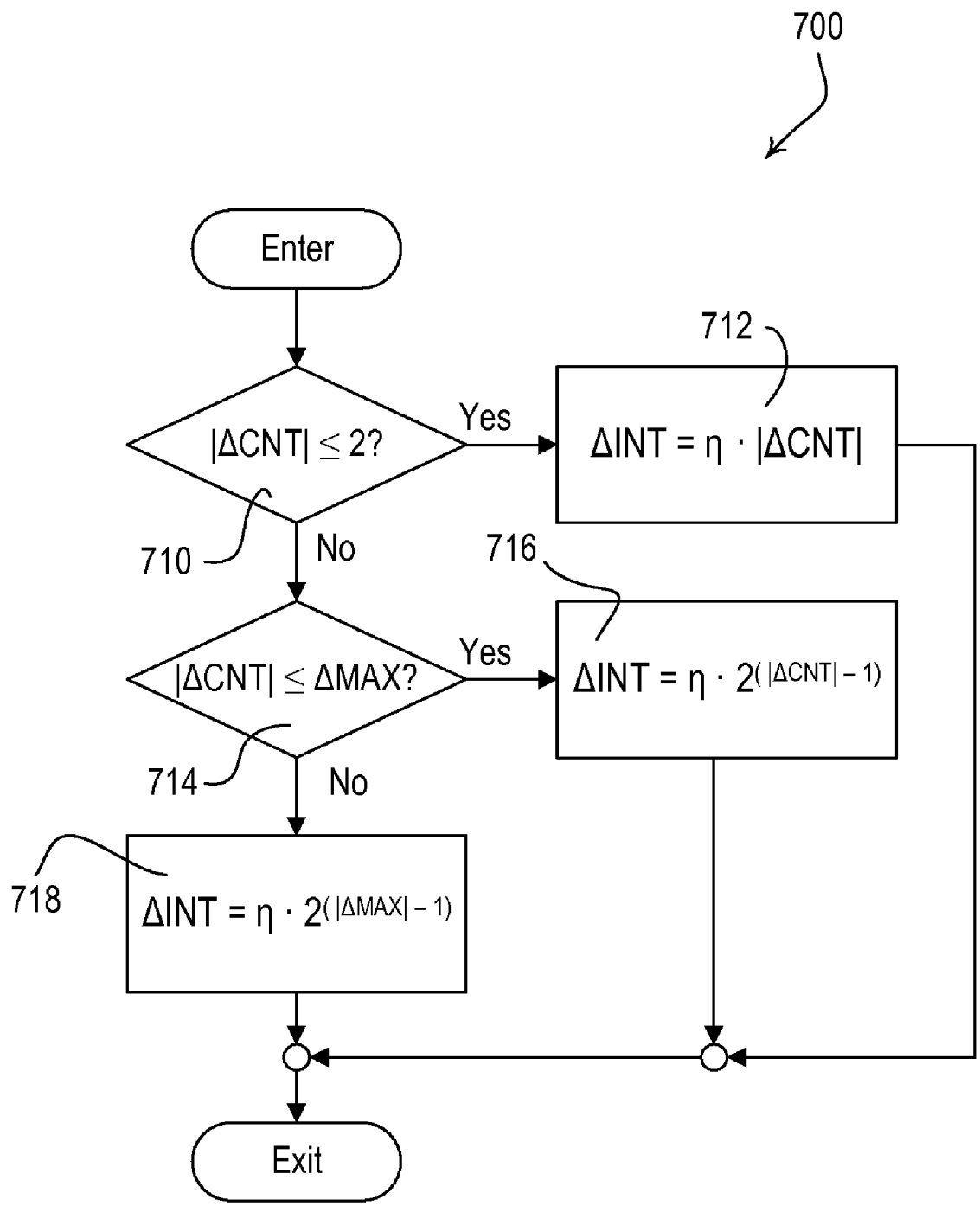
FIG. 10 is a simplified flowchart of the intensity acceleration routine executed by the controller of the lamp control module of FIG. 4.

FIG. 10 is a simplified flowchart of the intensity acceleration routine 700. If the absolute value of the counter value ΔCNT is less than or equal to two (2) at step 710, the intensity change value ΔINT is set equal to a constant η times the absolute value of the counter value ΔCNT at step 712. Preferably, the constant η equal eight. After the intensity change value ΔINT is set at step 712, the procedure 700 exits. If the absolute value of the counter value ΔCNT is greater than two (2) at step 710, but is less than or equal to a maximum counter change value ΔMAX, e.g., six (6), at step 714, the controller 214 applies the acceleration to the desired intensity change value ΔINT. Specifically, at step 716, the intensity change value ΔINT is computed as follows:

$$\Delta INT = \eta \cdot 2^{(|\Delta CNT|-1)}, \quad \text{(Equation 1)}$$

and the intensity acceleration routine 700 exits. In other words, the intensity change value ΔINT is set equal to the constant η times two to the power of the quantity (|ΔCNT|−1) at step 716. If the absolute value of the counter value ΔCNT is greater than the maximum counter change value ΔMAX at step 714, the intensity change value ΔINT is limited to:

$$\Delta INT = \eta \cdot 2^{(|\Delta MAX|-1)}, \quad \text{(Equation 2)}$$

at step 718, before the intensity acceleration routine 700 exits. In other words, the intensity change value ΔINT is set equal to the constant η times two to the power of the quantity (|ΔMAX|−1) at step 718.

Alternatively, during the intensity acceleration routine 700, the controller 214 could use a lookup table to determine the intensity change value ΔINT. For example, if the constant η equals eight (8), the controller 214 could use the absolute value of the counter value ΔCNT as the index in the following table to determine the intensity change value ΔINT.

| |ΔCNT| | ΔINT |
|---|---|
| 1 | 8 |
| 2 | 16 |
| 3 | 32 |
| 4 | 64 |
| 5 | 128 |
| ≥6 | 255 |

Referring back to FIG. 9, after executing the intensity acceleration routine 700, the intensity change value ΔINT is applied to the target intensity $L_{TARGET}$. Specifically, if the counter value ΔCNT is greater than zero (i.e., positive) at step 614, the target intensity $L_{TARGET}$ is set equal to the target intensity $L_{TARGET}$ plus the intensity change value ΔINT at step 616. Otherwise, if the counter value ΔCNT is negative at step 614, the target intensity $L_{TARGET}$ is set equal to the target intensity $L_{TARGET}$ minus the intensity change value ΔINT at step 618.

If the target intensity $L_{TARGET}$ is greater than zero at step 620 and less than the maximum intensity level $L_{MAX}$ (i.e., 255) at step 622, a determination is made at step 624 as to whether the lighting load 204 was just turned on. If not, the controller 214 simply subtracts the counter value ΔCNT being used during the present execution of the intensity adjustment procedure 600 from the counter at step 626, before the intensity adjustment procedure 600 exits. Accordingly, the next time that the intensity adjustment procedure 600 is executed, the controller 214 will consider the change in the value of the counter during the subsequent time period T. i.e., during the subsequent 100 msec. If the lighting load 204 was just turned on at step 624, the controller 214 generates the first audible sound at step 628 and subtracts the counter value ΔCNT from the counter at step 626, before the intensity adjustment procedure 600 exits.

If the target intensity level $L_{TARGET}$ is less than or equal to zero at step 620 (i.e., the lighting load 204 is off), the controller 214 limits the target intensity $L_{TARGET}$ to zero at step 630. If the lighting load 204 was not just turned off (during the present execution of the intensity adjustment procedure 600) at step 632, the controller 214 subtracts the counter value ΔCNT from the counter at step 626 and the procedure exits. However, if the lighting load 204 was just turned off at step 632, the controller 214 generates the second audible sound at step 634 and stores a minimum non-zero intensity level $L_{MIN}$, e.g., one (1), as the preset intensity $L_{PRESET}$ in the memory 222 at step 636, before the counter value ΔCNT is subtracted from the counter at step 626 and the procedure 600 exits.

If the target intensity level $L_{TARGET}$ is greater than or equal to the maximum intensity level $L_{MAX}$ at step 622 (i.e., the lamp control module 100 is at the high-end intensity), the target intensity $L_{TARGET}$ is limited to the maximum intensity level $L_{MAX}$ at step 638. The controller 214 then generates the first audible sound at step 628, before the counter value ΔCNT is subtracted from the counter at step 626 and the procedure 600 exits. Accordingly, when rotary knob 140 is being turned (i.e., the counter is changing) and the lamp control module 100 is at the high-end intensity at step 622, the controller 214 generates the first audible sound each time that the intensity adjustment procedure 600 is executed, i.e., once every 100 msec, to thus generate the ratcheting sound at a constant frequency $f_{CON}$.

Figure 11:
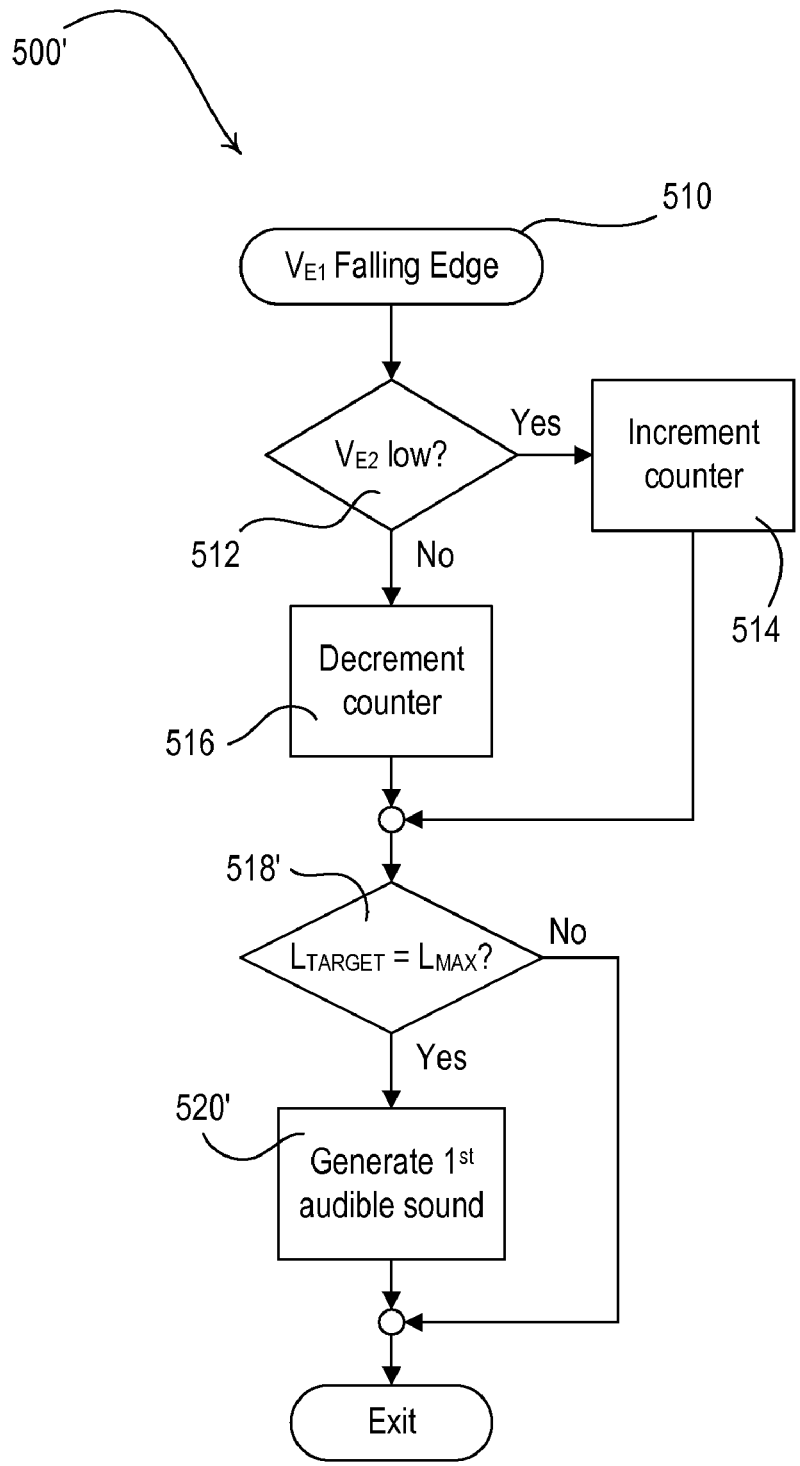
FIG. 11 is a simplified flowchart of a count procedure according to a second embodiment of the present invention.
Figure 12:
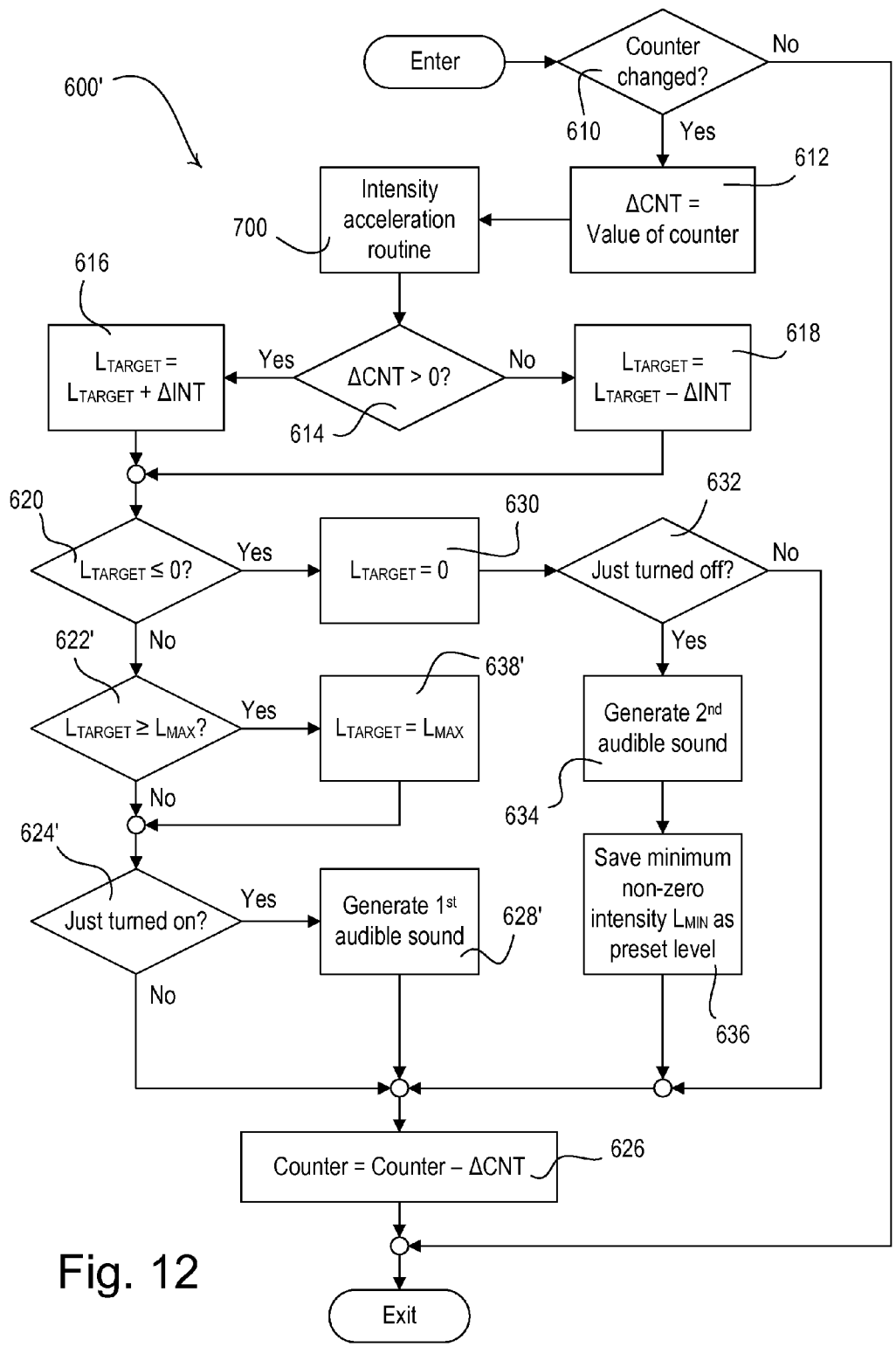
FIG. 12 is a simplified flowchart of an intensity adjustment procedure according to a second embodiment of the present invention.

FIGS. 11 and 12 are simplified flowcharts of a count procedure 500' and an intensity adjustment procedure 600', respectively, according to a second embodiment of the present invention. The count procedure 500' and the intensity adjustment procedure 600' are very similar to the count procedure 500 and the intensity adjustment procedure 600 of the first embodiment. However, the controller 214 does not generate the first audible sound each time that the intensity adjustment procedure 600' is executed when the lamp control module 100 is at the high-end intensity at step 622' and the rotary knob 140 is being turned. Instead, when the load control module 100 is at the high-end intensity at step 622', the controller 214 only generates the first audible sound during the intensity adjustment procedure 600' (at step 628') if the lighting load 204 was just turned on step 624'. The controller 214 creates the ratcheting sound by generating the first audible sound each time that the count procedure 500' is executed (at step 520') when the rotary knob 140 is being turned and the lamp control module 100 is at the high-end intensity at step 518'. Since the count procedure 500' is executed in response to the falling edges of the first encoder control signal $V_{E1}$, the first audible sound is generated repetitively at step 520' at a variable frequency $f_{VAR}$ in response to angular speed of the rotary knob 140. Accordingly, the faster than the rotary knob 140 is rotated clockwise at the high-end intensity, the more often the first audible sound will be generated at step 520'. In other words, as the angular speed ω of the rotary knob 140 increases at the high-end intensity, the variable frequency $f_{VAR}$ of the ratcheting sound also increases, and vice versa.

Figure 13:
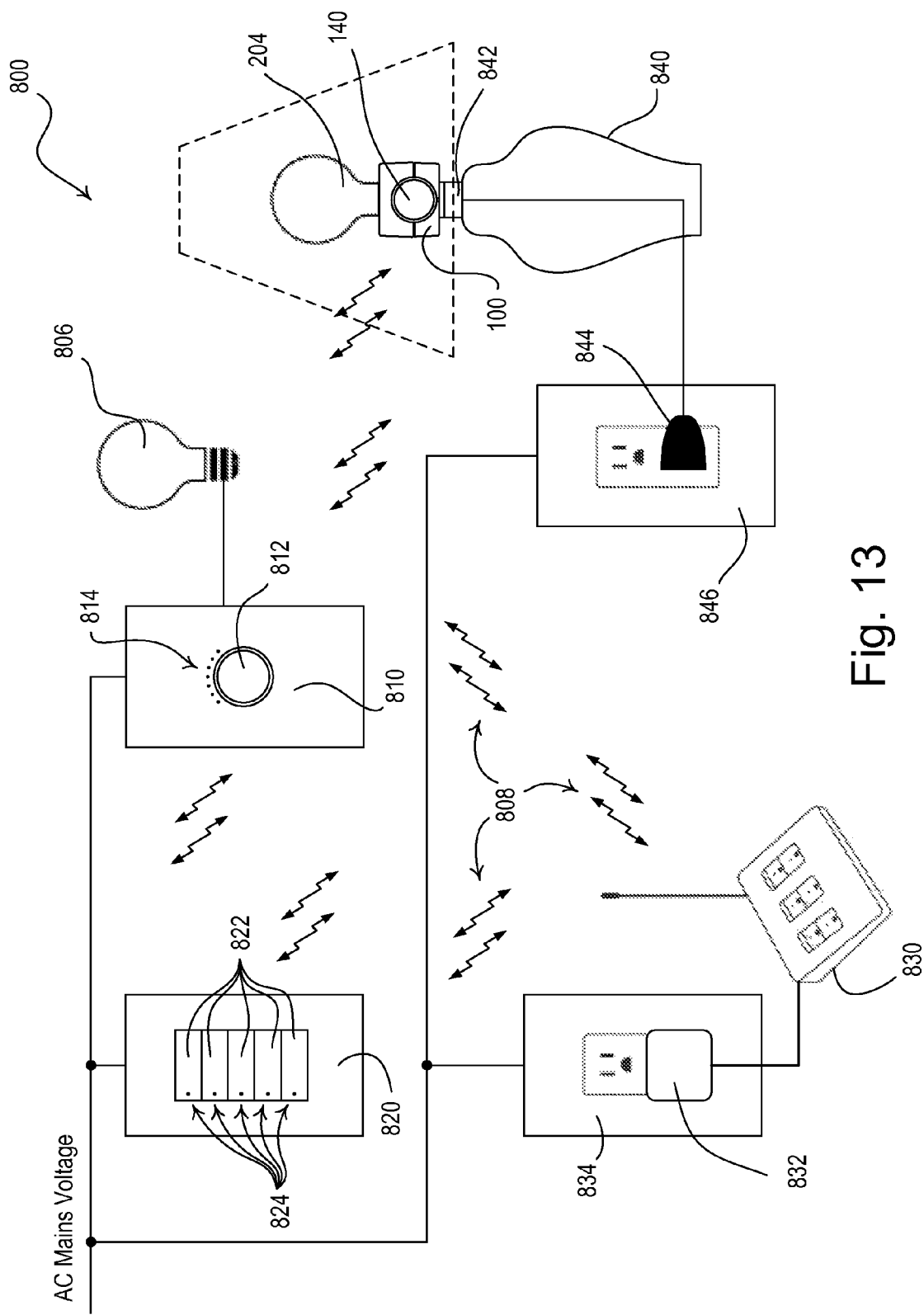
FIG. 13 is a simplified block diagram of a radio-frequency (RF) lighting control system comprising the lamp control module of FIG. 4.

FIG. 13 is a simplified block diagram of a radio-frequency (RF) lighting control system 800 comprising the lamp control module 100. The RF lighting control system 100 comprises a wall-mounted dimmer 810 and a wall-mounted keypad 820. The lamp control module 100, the dimmer 810, and the keypad 820 are operable to communicate with each other by transmitting and receiving digital messages across an RF communication link via RF signals 808.

Figure 14A:
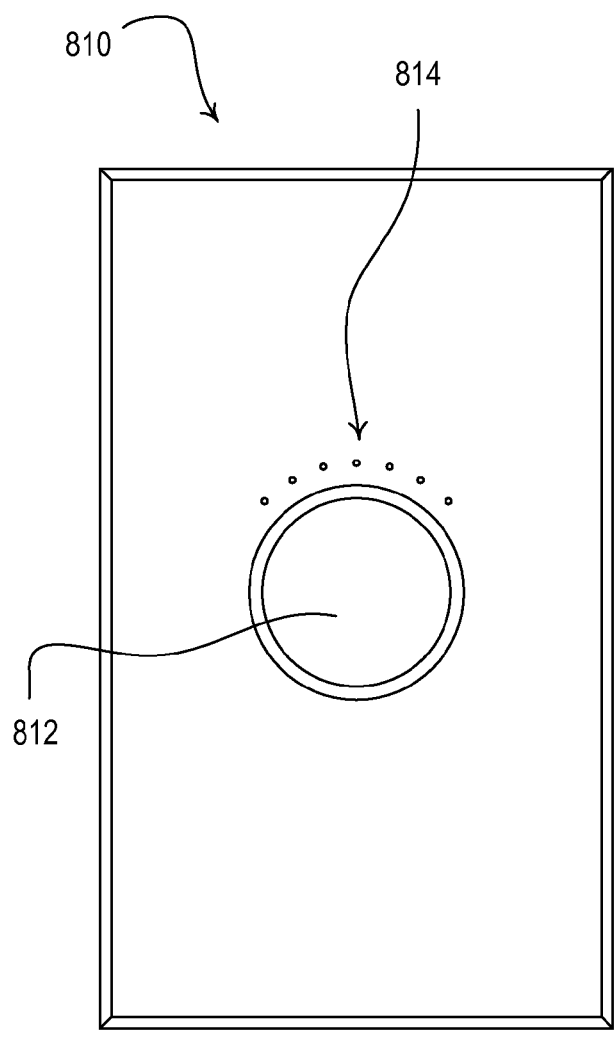
FIG. 14A is a front view of a wall-mounted dimmer having a rotary knob according to the present invention.
Figure 14B:
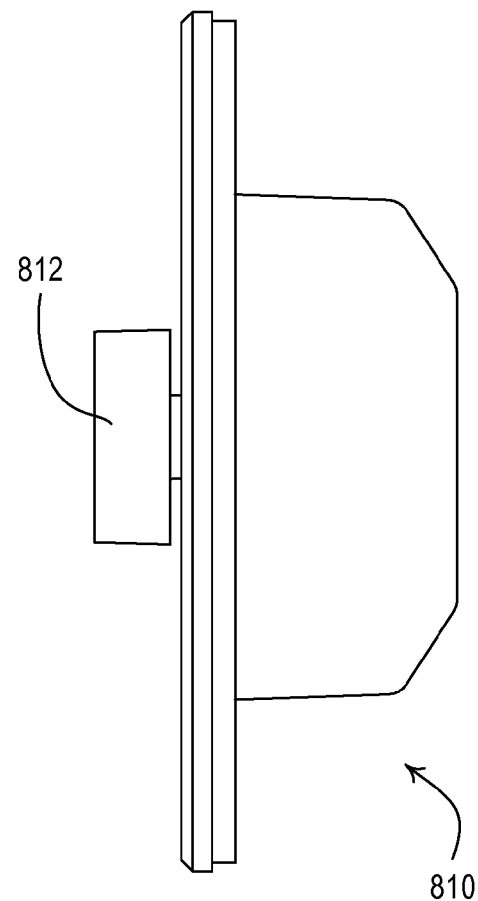
FIG. 14B is a right side view of the wall-mounted dimmer of FIG. 14A.

FIG. 14A is a front view and FIG. 14B is a right side view of the wall-mounted dimmer 810. The dimmer 810 is operable to control the intensity of a connected lighting load 806, and comprises a rotary intensity adjustment actuator, e.g., a rotary knob 812, for adjusting the intensity of the lighting load. The rotary knob 812 may also be pressed in towards the dimmer 810 in order to toggle the lighting load 806 on and off as with the lamp control module 100. The dimmer 810 further comprises a plurality of visual indicators 814 (e.g., LEDs) for displaying the intensity of the lighting load 806.

The keypad 820 comprises a plurality of preset buttons 822 (e.g., five buttons), which may be programmed, for example, to recall lighting presets or toggle one or more lighting loads 204, 806 on and off. The keypad 820 also comprises a plurality of visual indicators 824 (e.g., LEDs) for displaying feedback of, for example, which preset is selected or which lighting loads 204, 806 are energized. The RF lighting control system 800 also may comprise a signal repeater 830, which re-transmits any received digital messages to ensure that all of the control devices of the RF lighting control system 800 receive all of the RF signals 808. The signal repeater 830 is adapted to be coupled to the AC mains voltage via a power supply 832 plugged into an electrical outlet 834. The lamp control module 100 is screwed into a socket 842 of a table lamp 840. The table lamp 840 comprises an electrical plug 844 that is plugged into an electrical outlet 846 for powering the lighting load 204. An example of an RF lighting control system is described in greater detail in commonly-assigned co-pending U.S. patent application, Attorney Docket No. 08-21673 -P2, filed the same day as the present application, entitled COMMUNICATION PROTOCOL FOR A RADIO-FREQUENCY LOAD CONTROL SYSTEM, the entire disclosure of which is hereby incorporated by reference.

The lamp control module 100 and the wall-mounted dimmer 810 are operable to adjust the intensity level of the respective lighting loads 204, 806 in response to both the digital messages transmitted via the RF communication link and the actuations and rotations of the respective rotary knobs 140, 812. Since the rotary knobs 140, 812 have continuous rotations (i.e., no limits), turning each rotary knob in either direction adjusts the intensity level L of the respective lighting load 204, 806 from the present intensity level to the desired intensity level. Therefore, there are no discontinuities in the fading of the intensity levels L of the lighting loads 204, 806. The position of each rotary knob 140, 812 is not representative of the intensity level L of the respective lighting load 204, 806.

The lamp control module 100 and the dimmer 810 are also operable to control remotely-located electrical loads. For example, the RF lighting control system 800 could be configured such that the dimmer 810 transmits digital messages to the load control module 100 in response to rotations of the rotary knob 812 and the load control module 100 controls the intensity level of the connected lighting load 204 in response to the digital message, i.e., in response to the rotations of the rotary knob 812 of the dimmer 810.

Figure 15A:
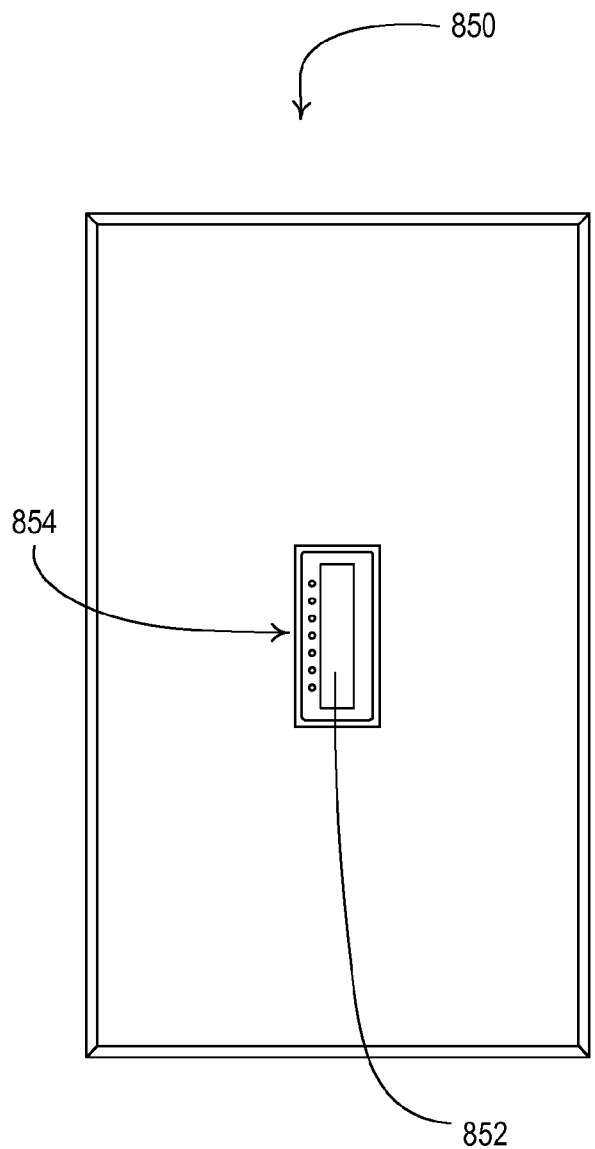
FIG. 15A is a front view of a wall-mounted dimmer having a rotary wheel according to the present invention.
Figure 15B:
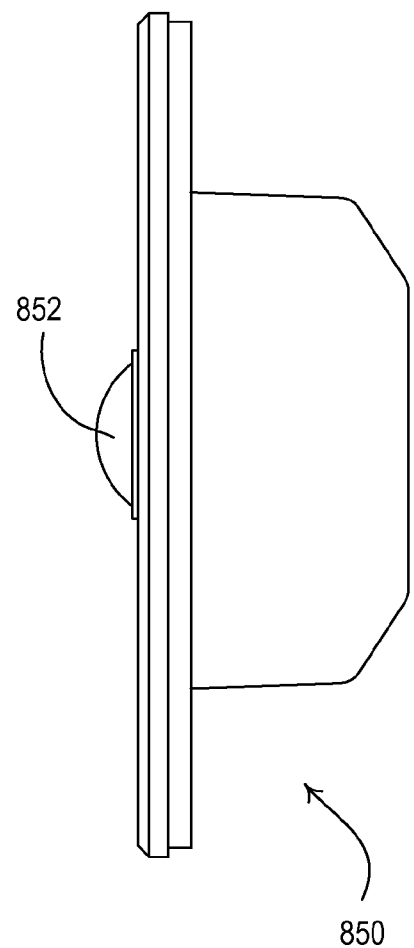
FIG. 15B is a right side view of the wall-mounted dimmer of FIG. 15A.

FIG. 15A is a front view and FIG. 15B is a right side view of a wall-mounted dimmer 850 having a rotary wheel 852 rather than the rotary knob 812. The user is operable to rotate the rotary wheel 852 upwards to increase the intensity of a connected lighting load and to rotate the rotary wheel downwards to decrease the intensity of the connected lighting load. The dimmer 850 is operable to provide acceleration of the intensity level of the lighting load 806 if the rotary wheel 852 is rotated quickly. Further, the dimmer 850 is operable to generate the ratcheting sound if the rotary wheel 852 is rotated upwards when the connected lighting load is at the high-end intensity. The dimmer 850 also comprises a plurality of visual indicators 854 (e.g., LEDs) for displaying the intensity of the connected lighting load. Alternatively, the lamp control module 100 could also include a rotary wheel (not shown) rather than the rotary knob 140.

Although the present invention has been described in relation to particular embodiments thereof, many other variations and modifications and other uses will be apparent to those skilled in the art. It is preferred, therefore, that the present invention be limited not by the specific disclosure herein, but only by the appended claims.

What is claimed is:

1. A load control device for controlling the amount of power delivered from an AC power source to an electrical load, the load control device comprising:
   a controllably conductive device adapted to be coupled in series electrical connection between the AC power source and the electrical load for controlling the amount of power delivered to the load;
   a controller coupled to a control input of the controllably conductive device, the controller operable to selectively render the controllably conductive device conductive and non-conductive to control the amount of power delivered to the load;
   a rotary actuator operable to rotate in a first direction and a second direction, the controller responsive to rotations of the rotary actuator to adjust the amount of power delivered to the load when the rotary actuator is rotated; and
   an audible sound generator responsive to the controller, the controller operable to cause the audible sound generator to repeatedly generate an audible sound when the lamp control module is delivering a predetermined amount of power to the load and the rotary actuator is rotated.

2. The load control device of claim 1, wherein the controller is operable to increase the amount of power delivered to the load when the rotary actuator is rotated in a first direction, and to cause the audible sound generator to repeatedly generate the audible sound when the rotary actuator is rotated in the first direction and the lamp control module is delivering a maximum amount of power to the load.

3. The load control device of claim 1, wherein the controller is operable to decrease the amount of power delivered to the load when the rotary actuator is rotated in a second direction, and to cause the audible sound generator to repeatedly generate the audible sound when the rotary actuator is rotated in the second direction and the lamp control module is delivering a minimum amount of power to the load.

4. The load control device of claim 3, wherein the electrical load is off when the lamp control module is delivering the minimum amount of power to the load.

5. The load control device of claim 1, wherein the controller is operable to cause the audible sound generator to generate the audible sound at a constant frequency.

6. The load control device of claim 1, wherein the controller is operable to cause the audible sound generator to generate the audible sound at a variable frequency dependent upon an angular velocity of the rotary actuator.

7. The load control device of claim 1, wherein the controller is operable to cause the audible sound generator to repeatedly generate the audible sound to produce a ratcheting sound.

8. The load control device of claim 1, wherein the rotary actuator is operable to be pressed in towards the load control device, the controller responsive to presses of the rotary actuator to toggle the electrical load on and off, the controller operable to cause the audible sound generator to generate a second audible sound when the rotary actuator is pressed and the lighting load is toggled off, and to generate the first audible sound when the rotary actuator is pressed and the lighting load is toggled on.

9. The load control device of claim 1, wherein the rotary actuator comprises a rotary knob adapted to be rotated in a clockwise direction and a counter-clockwise direction.

10. The load control device of claim 1, wherein the rotary actuator comprises a rotary scroll wheel.

11. A method of generating an audible sound in a load control device for controlling the amount of power delivered from an AC power source to an electrical load, the method comprising the steps of:
providing a rotary actuator on the load control device;
adjusting the amount of power delivered to the load when the rotary actuator is rotated; and
repeatedly generating an audible sound when the rotary actuator is rotated and the lamp control module is delivering a predetermined amount of power to the load.

12. The method of claim 11, wherein the step of adjusting further comprises increasing the amount of power delivered to the load when the rotary actuator is rotated in a first direction, and the step of repeatedly generating an audible sound comprises repeatedly generating the audible sound when the lamp control module is delivering a maximum amount of power to the load and the rotary actuator is rotated in the first direction.

13. The method of claim 11, wherein the step of repeatedly generating an audible sound comprises generating the audible sound at a constant frequency.

14. The method of claim 11, further comprising:
determining an angular velocity of the rotary actuator;
wherein the step of repeatedly generating an audible sound comprises generating the audible sound at a variable frequency in response to the step of determining an angular velocity of the rotary actuator.

15. A load control device for controlling the amount of power delivered from an AC power source to an electrical load, the load control device comprising:
a controllably conductive device adapted to be coupled in series electrical connection between the AC power source and the electrical load for control of the amount of power delivered to the load;
a controller coupled to a control input of the controllably conductive device, the controller operable to selectively render the controllably conductive device conductive and non-conductive to control the amount of power delivered to the load;
a rotary actuator operable to rotate in a first direction and a second direction, the controller responsive to rotations of the rotary actuator to increase the amount of power delivered to the load when the rotary actuator is rotated in the first direction and to decrease the amount of power delivered to the load when the rotary actuator is rotated in the second direction; and
a rotary encoder having a shaft coupled to the rotary actuator and operable to generate one or more control signals in response to the rotations of the rotary actuator, the rotary encoder coupled to the controller, such that the controller is operable to control the amount of power delivered to the load in response to the one or more control signals;
wherein the controller is operable to accelerate the rate of change of the amount of power delivered to the load in response to the angular velocity of the rotary actuator.

16. The load control device of claim 15, wherein the controller is operable to increase the amount of power delivered to the load at a first rate when the rotary actuator is rotated in the first direction at a first angular velocity, and to increase the amount of power delivered to the load at a second rate when the rotary actuator is rotated in the first direction at a second angular velocity.

17. The load control device of claim 16, wherein the ratio of the second rate to the second angular velocity is greater than the ratio of the first rate to the first angular velocity.

18. The load control device of claim 15, wherein the controller is operable determine the direction and the angular velocity of the rotary actuator in response to the one or more control signals.

19. The load control device of claim 15, wherein the rotary actuator comprises a rotary knob adapted to be rotated such that the first direction is clockwise and the second direction is counter-clockwise.

20. The load control device of claim 15, wherein the rotary actuator comprises a rotary wheel.

* * * * *